United States Patent
Abe et al.

(10) Patent No.: US 8,456,440 B2
(45) Date of Patent: *Jun. 4, 2013

(54) INFORMATION PROCESSING METHOD AND APPARATUS

(75) Inventors: Ken-ichi Abe, Tokyo (JP); Katsutoshi Nagato, Tachikawa (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,743

(22) Filed: Jul. 3, 2012

(65) Prior Publication Data

US 2012/0268407 A1 Oct. 25, 2012

Related U.S. Application Data

(63) Continuation of application No. 12/506,630, filed on Jul. 21, 2009, now Pat. No. 8,243,035.

(30) Foreign Application Priority Data

Jul. 30, 2008 (JP) .................................. 2008-196847

(51) Int. Cl.
G06F 3/041 (2006.01)
(52) U.S. Cl.
USPC .......................................... 345/173; 345/629

(58) Field of Classification Search
USPC ................. 345/173, 179, 629, 634, 636, 637, 345/641
See application file for complete search history.

(56) References Cited

U.S. PATENT DOCUMENTS

| 7,138,983 B2 | 11/2006 | Wakai et al. |
| 2004/0037016 A1 | 2/2004 | Kaneko et al. |
| 2004/0049743 A1 | 3/2004 | Bogward |
| 2006/0209039 A1 | 9/2006 | Destura et al. |
| 2008/0068343 A1 | 3/2008 | Hoshino et al. |
| 2010/0026647 A1 | 2/2010 | Abe et al. |

FOREIGN PATENT DOCUMENTS

| JP | 5-100809 A | 4/1993 |
| JP | 2001-290585 A | 10/2001 |
| JP | 2008-071102 A | 3/2008 |

OTHER PUBLICATIONS

Japanese Office Action for JP2008-196847, mail date Jun. 15, 2012. Cited in parent U.S. Appl. No. 12/506,630.

*Primary Examiner* — Ricardo L Osorio
(74) *Attorney, Agent, or Firm* — Rossi, Kimms & McDowell LLP

(57) ABSTRACT

An information processing apparatus comprising a touch screen which detects a touch input by a user detects the position and pressure of each of a plurality of pressed points corresponding to a plurality of touch inputs existing at the same time on a touch screen. Then, the front/rear overlap relationship of the plurality of objects displayed on the touch screen is changed based on the difference in pressure between the detected plurality of pressed points.

22 Claims, 12 Drawing Sheets

FIG. 5A

TRAJECTORY OF POINT A 501

| TIME | X | Y |
|---|---|---|
| t1 | x1a | y1a |
| t2 | x2a | y2a |
| t3 | x3a | y3a |
| t4 | x4a | y4a |
| t5 | x5a | y5a |

FIG. 5B

TRAJECTORY OF POINT B 502

| TIME | X | Y |
|---|---|---|
| t1 | x1b | y1b |
| t2 | x2b | y2b |
| t3 | x3b | y3b |
| t4 | x4b | y4b |
| t5 | x5b | y5b |

| TIME | PRESSURE AT POINT A | PRESSURE AT POINT B |
|---|---|---|
| t1 | 150 | 100 |
| t2 | 150 | 100 |
| t3 | 150 | 100 |
| t4 | 150 | 100 |
| t5 | 150 | 100 |

INFORMATION PROCESSING METHOD AND APPARATUS

CROSS-REFERENCE TO RELATED APPLICATIONS

This is a continuation of U.S. patent application Ser. No. 12/506,630, filed Jul. 21, 2009, which is based on and claims priority from Japanese Application Number JP 2008-196847, filed on Jul. 30, 2008. The disclosure of the priority applications, in their entirety, including the drawings, claims, and the specifications thereof, are herein incorporated by reference.

BACKGROUND OF THE INVENTION

1. Field of the Invention

The present invention relates to an information processing apparatus and method which provide a user interface which uses a touch screen.

2. Description of the Related Art

Recently, there has been a focus on an interface in which objects on a screen are operated on using hand gestures on a touch screen. Input on a touch screen allows more intuitive operation in comparison with an interface which uses an input device such as a mouse or keyboard. Furthermore, with recent advances in contact detection devices, it has become possible to identify complicated gestures which allow intuitive operation on a touch screen.

In Japanese Patent Laid-Open No. 2001-290585 (hereinafter, patent document), a method which detects complicated trajectories of two or more indicated positions which move at the same time, and performs an operation on the objects displayed on the touch screen in accordance with each of the detected trajectories is proposed.

A method which performs an operation on objects on the screen in accordance with a pressure which presses down on the touch screen is described in the aforementioned patent document. According to this patent document, an increase in pressure corresponds to a larger amount of page scroll or a larger amount of magnification/reduction, in the case that the pressure exceeds a constant, the amount of operation becomes maximal, and when the pressure exceeds a constant, the operation is repeated.

However, while operation by a plurality of pressed forces on the touch screen is mentioned in the aforementioned patent document, there is no mention of operation designation in accordance with a difference in pressure between a plurality of pressed forces.

SUMMARY OF THE INVENTION

The present invention was made in consideration of such circumstances, and according to an embodiment of the present invention, a user interface which uses a difference in pressure between a plurality of pressed forces on a touch screen for greater liberty is provided.

According to one aspect of the present invention, there is provided an information processing method in an information processing apparatus comprising a touch screen which detects a touch input by a user, comprising: detecting position and pressure of each of a plurality of pressed points corresponding to a plurality of touch inputs existing at the same time on the touch screen; and changing the front/rear overlap relationship of a plurality of objects displayed on the touch screen based on a pressure difference between the plurality of pressed points detected by the detecting step.

Furthermore, according to another aspect of the present invention, there is provided an information processing apparatus comprising a touch screen which detects a touch input by a user, comprising: a detecting unit configured to detect position and pressure of each of a plurality of pressed points corresponding to a plurality of touch inputs existing at the same time on the touch screen; and a changing unit configured to change the front/rear overlap relationship of a plurality of objects displayed on the touch screen based on a pressure difference between the plurality of pressed points detected by the detecting unit.

Further features of the present invention will become apparent from the following description of exemplary embodiments with reference to the attached drawings.

BRIEF DESCRIPTION OF THE DRAWINGS

FIGS. 5A and 5B are diagrams illustrating examples of data records of tables which store trajectories of input positions in the information processing apparatus according to the first embodiment.

FIG. 6 is a diagram illustrating an example of a data record of a table which stores trajectories of input pressures in the information processing apparatus according to the first embodiment.

DESCRIPTION OF THE EMBODIMENTS

Hereinafter, preferred embodiments of the present invention will be explained with reference to the attached drawings.

Figure 1:
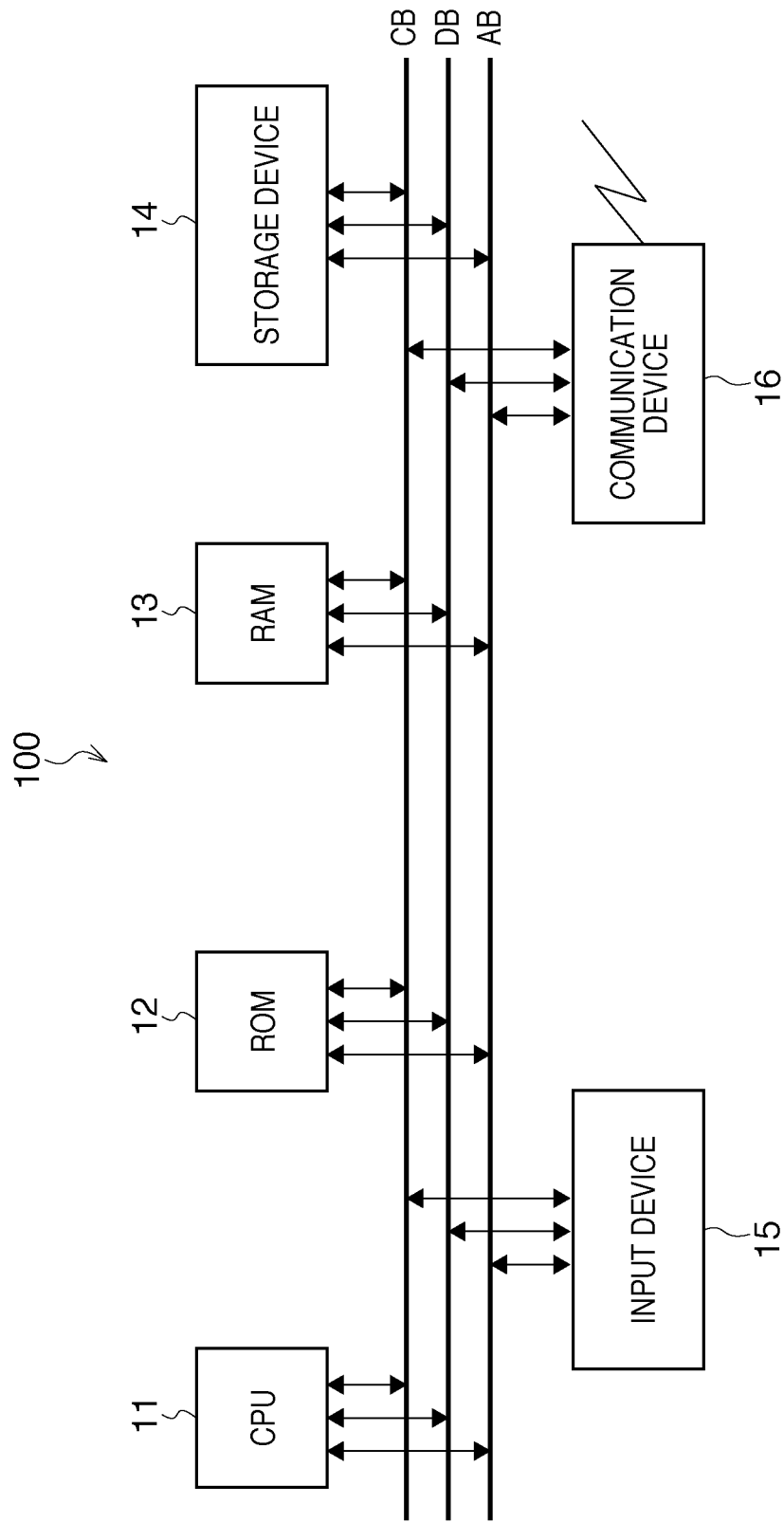
FIG. 1 is a block diagram illustrating a structural example of the information processing apparatus according to an embodiment.

FIG. 1 is a block diagram roughly illustrating a structural example of the hardware of the information processing apparatus 100 according to the present embodiment.

In FIG. 1, a microprocessor (CPU) 11 controls each structural element of the information processing apparatus 100, as well as executes all calculations and logical determinations, etc. A fixed memory (ROM) 12 is a read only memory which stores control program code for a processing program, etc., which is run by the CPU 11. A random access memory (RAM) 13 is a writable memory used to temporarily store all data sent from all structural elements. A storage device 14 is comprised of any type of disk device such as a hard disk and/or flash memory, and stores data that is being processed, image files, and metadata, etc. An input device 15 is equipped with a touch screen which executes operation input through contact with the screen. A communication device 16 is comprised of a line or wireless communication device such as an external input/output device such as a USB or a modem, etc., and performs data exchange with an external device. All of the aforementioned compositions are connected to each other through an address bus AB, control bus CB, and data bus DB.

The address bus AB is a bus for transferring an address signal for designating a structural element targeted for control by the CPU 11. The control bus CB is a bus for transferring a control signal applied by the CPU 11 to each structural element targeted for control by the CPU 11. The data bus DB is a bus for transferring data between structural elements.

The information processing unit 100 operates in accordance with each input from the input device 15 and with each input provided from the communication device 16 through a network. When an input from the input device 15 or an input from the communication device 16 is provided, an interrupt signal is sent to the CPU 11. The CPU 11 reads out each control signal stored in the storage device 14 in accordance with the interrupt signal, and executes each control according to those control signals.

Figure 2:
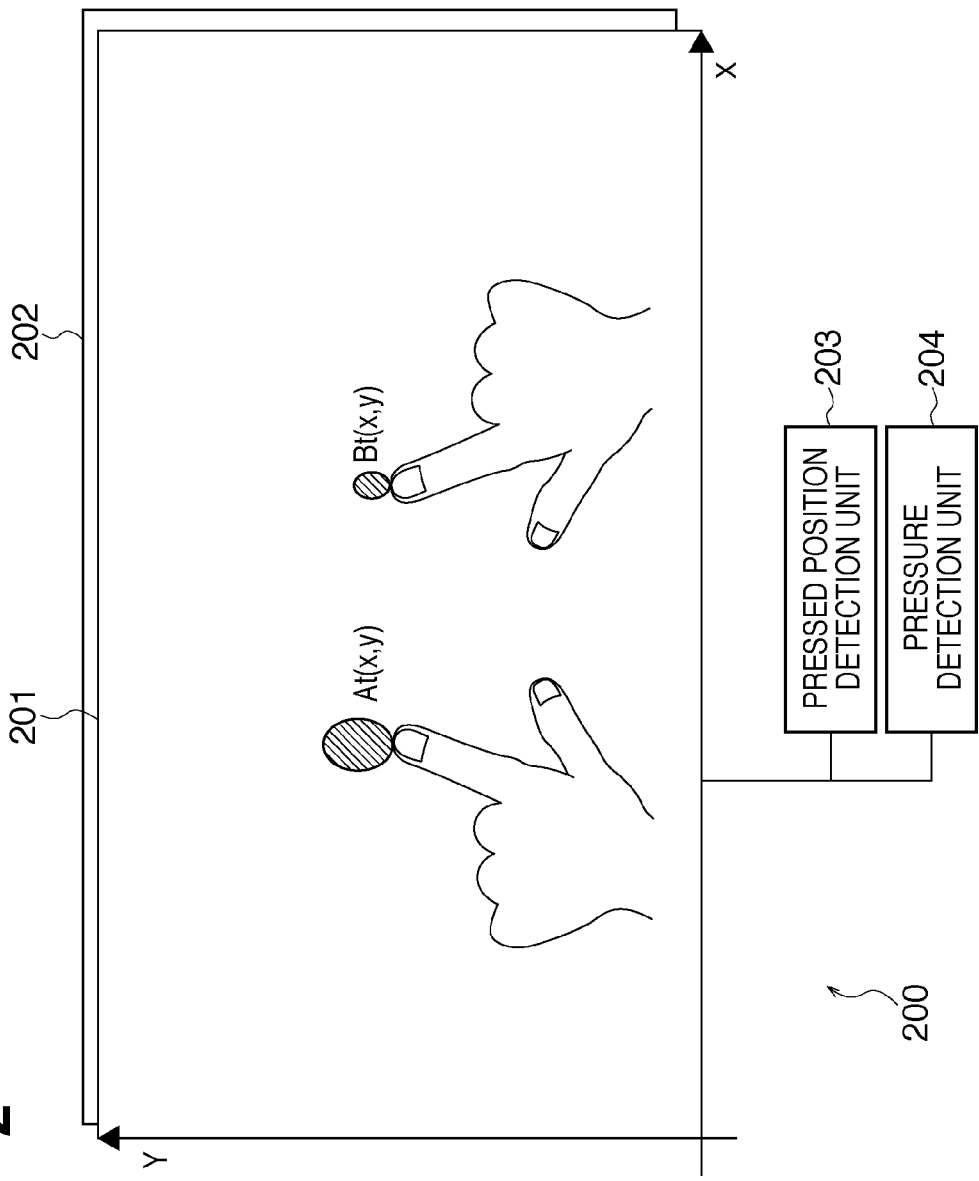
FIG. 2 is a diagram representing a structural example of a touch screen of an input device according to an embodiment.

FIG. 2 is a diagram illustrating a touch screen 200 equipped by the input device 15 in the information processing apparatus 100 of the present embodiment. The touch screen 200 has a touch input unit 201 which inputs operations from the operator, and a display unit 202 which displays an image. Furthermore, the touch screen comprises a pressed position detection unit 203 which detects each position (coordinate) of a plurality of pressed points corresponding to a plurality of touch inputs on the screen, and a pressure detection unit 204 which detects each pressure of a plurality of pressed points. An example in which the screen is pressed by a finger on the left and right hands at the same is illustrated in FIG. 2.

In the touch screen 200, from the lower left of the screen, the X-axis is taken in the rightward direction, while the Y-axis is taken in the upward direction, and the coordinate positions and pressures of a plurality of points pressed on the screen are detected. In FIG. 2, a situation in which a coordinate of a point pressed by a finger on the left hand at time t is detected to be At(x,y), while a coordinate of a point pressed by a finger on the right hand is detected to be Bt(x,y) is illustrated. Furthermore, at the pressed points of the left and right fingers, a shadow with an area which becomes larger as the pressure becomes larger is displayed, and the user can be aware of the size of the pressures (difference) of each pressed point. That is, on the touch screen 200 of the present embodiment, a display shape is changed in accordance with the pressure to display a pressed point such that the user can be aware of the pressures (or the difference in pressure) of a plurality of detected pressed points.

Figures 3, 4:
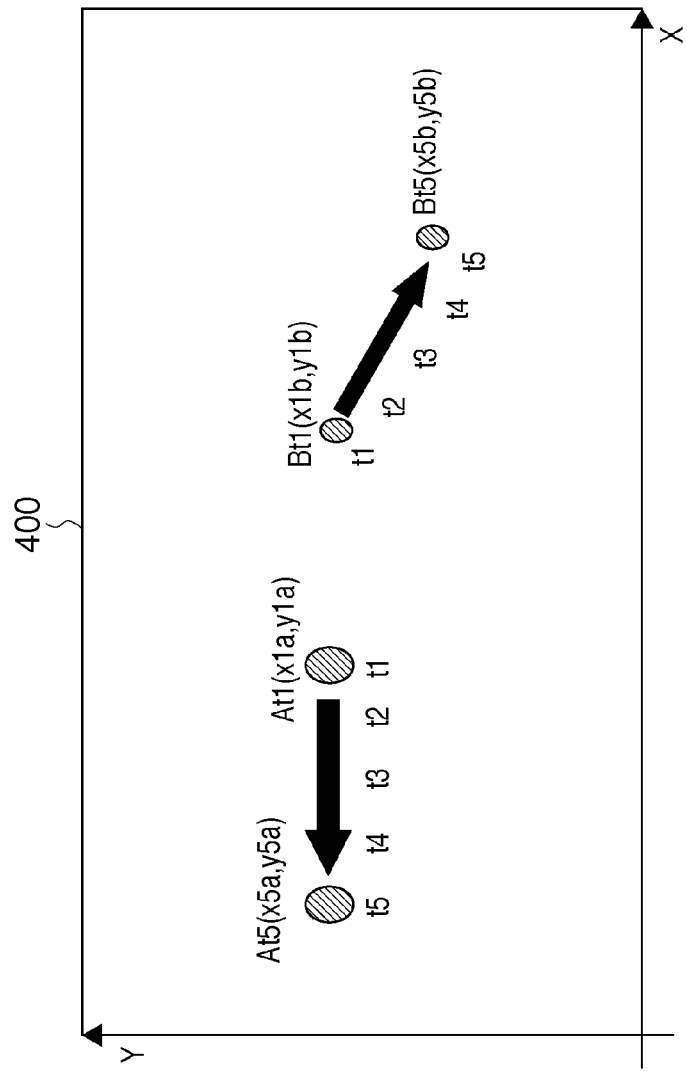
FIG. 3 is a diagram illustrating an example of a data record of a table which stores the pressures of pressed points of the system according to the embodiment.
FIG. 4 is a diagram illustrating an example of an input operation to the input device according to the first embodiment.

FIG. 3 is a data table illustrating the contact pressure of each pressed position detected by the touch screen 200 when it is pressed as illustrated in FIG. 2. The CPU 11 records the pressures of the plurality of pressed points at time t detected by the touch screen 200 (pressed position detection unit 203 and pressure detection unit 204) as a table 300 in, for example, a RAM 13.

FIG. 4, FIG. 5A, FIG. 5B, and FIG. 6 are diagrams explaining processing which traces trajectories in the case that pressed points are slid over the touch screen.

FIG. 4 illustrates the pressed points at positions At1 and Bt1 at time t1 being slid over the screen to At5 and Bt5, respectively, at time t5 over times t2, t3 and t4. Furthermore, at this time, as shown in FIG. 5A and FIG. 5B, the CPU 11 records the positional coordinate of each point (positional coordinate of each point as the trajectories of each of point A and point B at reference times t1, t2, t3, t4, and t5) detected by the pressed position detection unit 203 in, for example, the RAM 13. At the same time, as shown in FIG. 6, the CPU 11 records the pressure of each point at each positional coordinate detected by the pressure detection unit 204 in, for example, the RAM 13.

In this manner, the trajectories of a plurality of an operator's fingers on the screen are recorded from contact to release. In the present embodiment, the operation of an object on the screen is interpreted in accordance with the thus obtained trajectories of the positions and pressures of the pressed points on the touch screen. Hereinafter, processing which interprets an operation to be executed from the obtained trajectories of the positions and pressures of two or more pressed points will be specifically explained.

Figure 7:
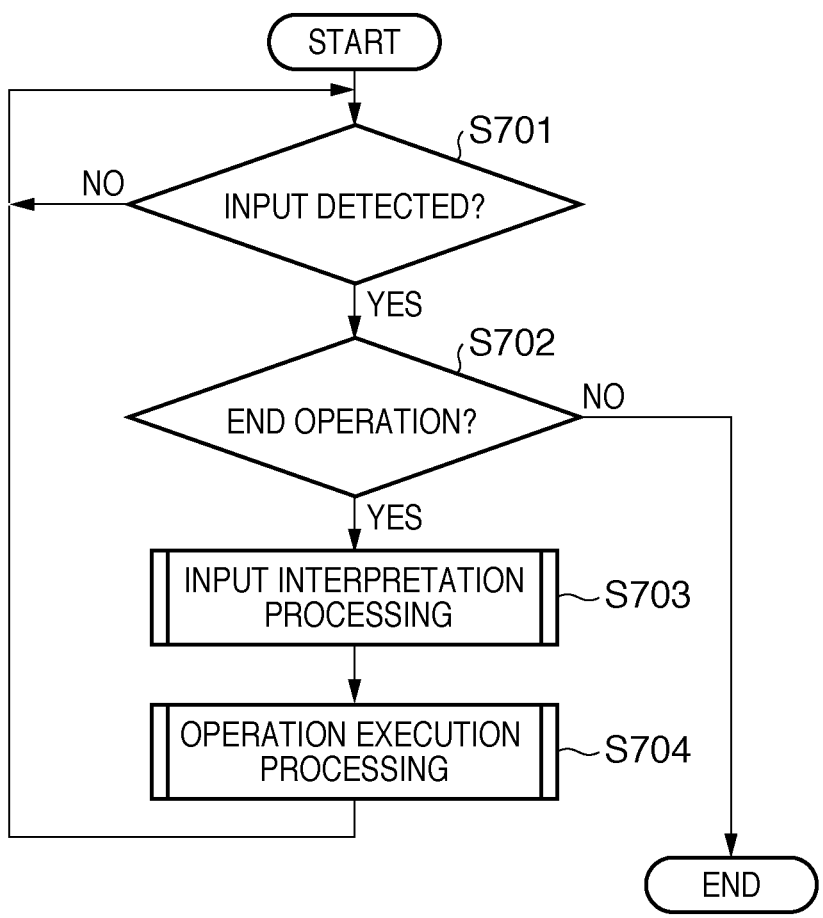
FIG. 7 is a flowchart illustrating the flow of the processing in the information processing apparatus according to the first embodiment.

FIG. 7 is a flowchart illustrating the flow of the processing of the present embodiment. Moreover, the processing illustrated in FIG. 7 is realized by a CPU 11 executing a program stored in a ROM 12 or a program loaded into a RAM 13.

In step S701, the CPU 11 determines whether or not a pressed input was detected by the touch screen 200. If a pressed input has not been detected, detection is awaited. In the case that a pressed input has been detected, in step S702, the CPU 11 determines whether or not an ending operation has been executed. In the present embodiment, an ending operation is determined to have been executed in the case that a pressure on the touch input unit 201 of the touch screen 200 is released. In the case that it is determined that an ending operation has been executed, the CPU 11 ends the present processing.

When it is determined that an ending operation has not been executed in step S702, the process advances to step S703. In step S703, the CPU 11 interprets which operation is designated by the input on the touch screen 200 based on the pressed position and pressure detected on the touch screen 200. Then, in step S704, the CPU 11 executes the operation interpreted in step S703. In the aforementioned manner, in the case that an ending operation has not been executed, the next input is awaited, and when an input is detected, processing which interprets and executes that input is repeated.

Figure 8A:
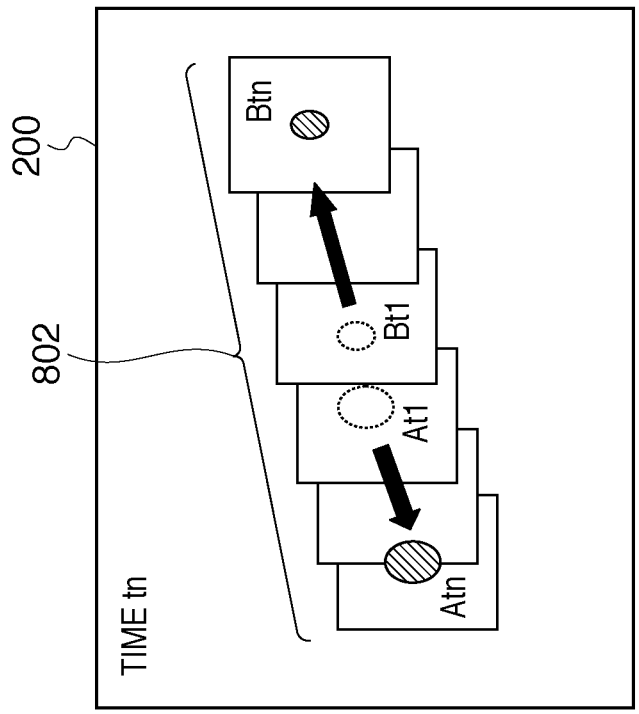
FIGS. 8A and 8B are diagrams illustrating an example of an object alignment operation by the information processing apparatus according to the first embodiment.
Figure 8B:
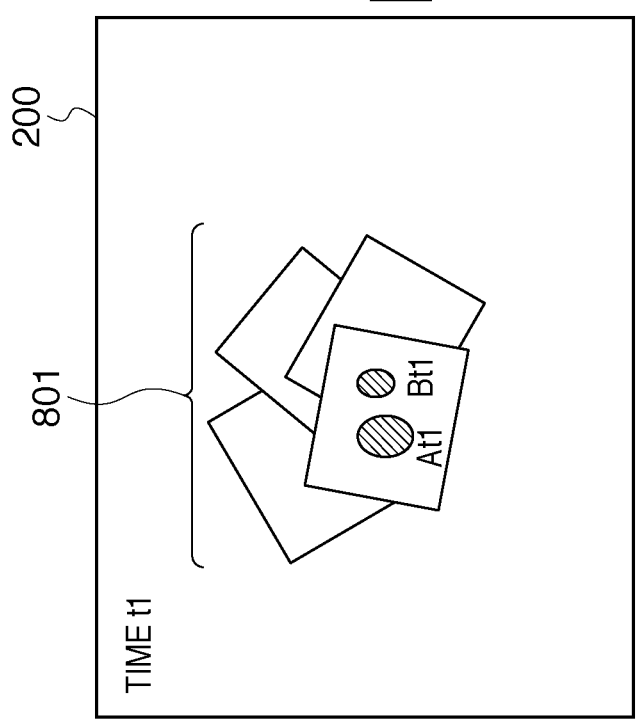

FIGS. 8A and 8B are diagrams explaining an embodiment of processing which aligns objects on the screen based on the trajectories of the positions and the trajectories of the pressures of two pressed points.

At time t1, a collection of objects 801 is displayed on the touch screen 200 as shown in FIG. 8A, and this collection of objects 801 has been selected by a predetermined operation on the touch screen 200 (hereinafter described step S901). Then, two points (At1 and Bt1) in this collection of objects 801 are pressed as shown in FIG. 8A. From this state, the two pressed points A and B are slid in directions such that they become further away from each other until time tn, and the state in which point A has moved to coordinate Atn and point B has moved to coordinate Btn is shown in FIG. 8B.

By this operation, each object in the group of objects 801 on the screen is aligned between point A and point B as the object array 802. Furthermore, alignment is done such that objects in the direction of point B for which the pressure is smaller are displayed in front based on the difference in pressure between point A and point B. For this reason, by displaying objects which are pressed harder by a finger such that they sink lower (deeper into the screen), an intuitive operation environment can be provided to the user.

Figure 9:
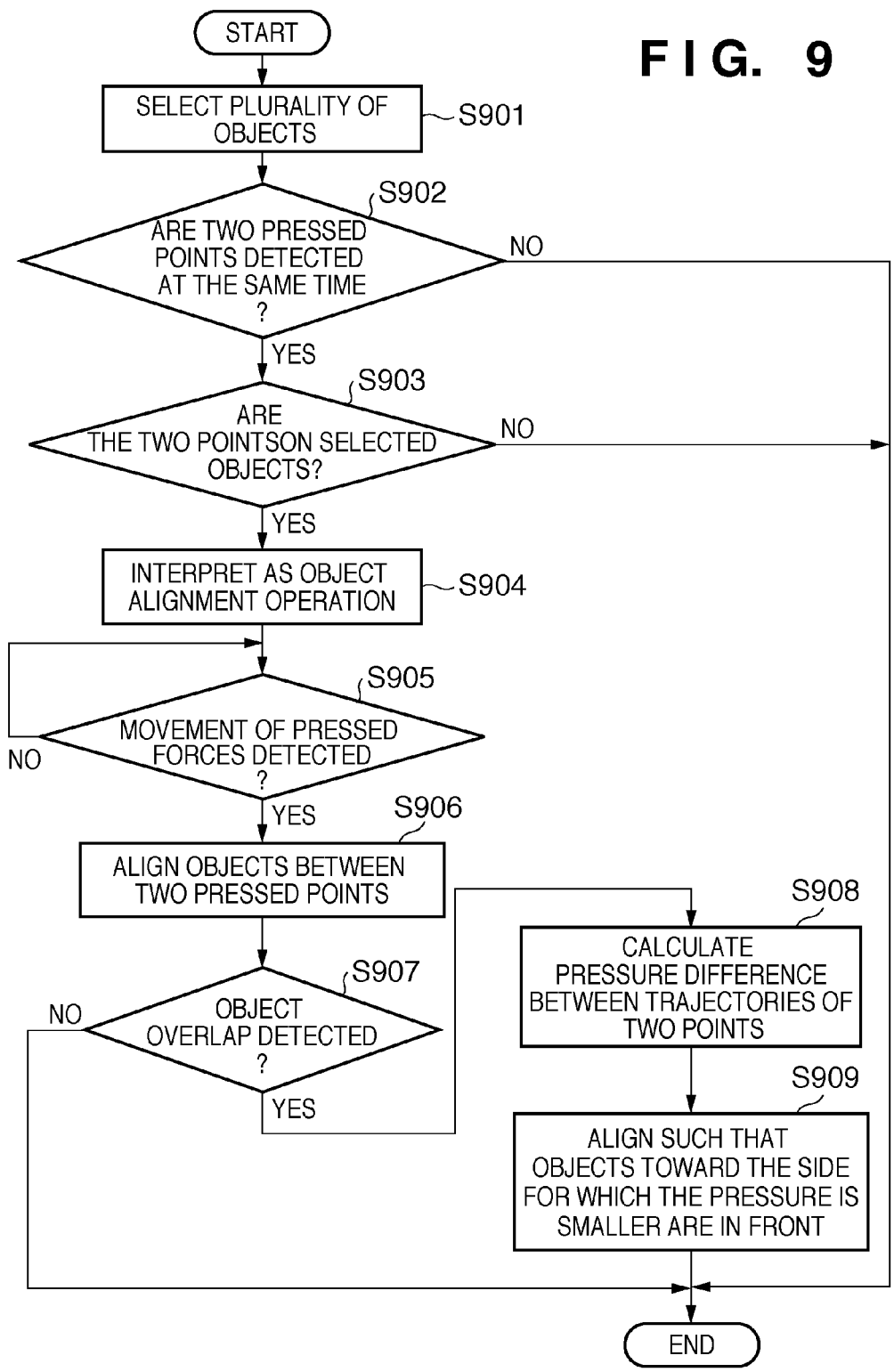
FIG. 9 is a flowchart illustrating processing of an object alignment operation by the information processing apparatus according to the first embodiment.

Using FIG. 9, the processing of the CPU 11 which realizes the aforementioned alignment operation will be explained. FIG. 9 is a flowchart corresponding to input interpretation processing in step S703 in FIG. 7 and operation execution processing in step S704.

In step S901, the CPU 11 sets the plurality of objects displayed on the screen to a selected state by a predetermined operation input on the touch screen 200. For example, objects inside a circle are in a selected state by a gesture called a loop operation in which the perimeter of a collection of objects to be selected is enclosed by a circular shape (or a closed figure) made by a finger. Of course, the selection method is not limited to this operation. For example, by designating one object, an object group for which there is at least one overlapping portion including the designated object may be selected. Thus, in step S901, a plurality of objects is selected from the objects displayed on the touch screen 200 in accordance with a touch input on the touch screen 200.

In step S902, the CPU 11 determines whether or not two pressed points are detected (exist) at the same time on the touch screen 200 (the points to not have to be pressed at the same time). In the case that they are detected, the process advances to step S903. In the case that such pressed points have not been detected after a predetermined amount of time passes, or if a pressed point with an intention for a different operation is detected, the present operation is ended. As a pressed point with an intention for a different operation, a case in which only one pressed point exists and it begins to move, etc., can be given.

In step S903, the CPU 11 determines whether or not both of the two pressed points detected in step S902 are pressing the collection of objects selected in step S901 at the same time. The CPU 11 executes the aforementioned determination by comparing the positional coordinates (the region in which the collection of objects exists) of the collection of objects with the positional coordinates of the pressed points, and checking whether or not there is an overlap between the two. In the case that there are two pressed points on the selected collection of objects such as At1 and Bt1 in FIG. 8, the process advances to the next step S904. Otherwise, it is determined that there is another operation, and the present operation is ended.

In step S904, the CPU 11 interprets the operator's operation to be executed to be an operation to align the selected objects, since the two pressed points are on the selected objects at the same time by the determination in step S903.

In step S905, the CPU 11 detects whether or not the relative distance between the two pressed points is changing. In the case that the relative distance between the two pressed points is not changing, no operation is performed. In the case that a change in the relative distance is detected, the process moves to the next step S906.

In step S906, the CPU 11 aligns the objects between the two pressed points after movement based on the alignment designation interpreted in step S904. That is, the CPU 11 aligns each object in the designated collection of objects 801 such that the two pressed points Atn and Btn after movement are the ends, and the centers of the objects are equally spaced apart, as shown in the object array 802 in FIG. 8B. Moreover, in the present embodiment, although the relative direction of movement of the pressed points is a straight line, and the objects are arranged on a straight line with endpoints at Atn and Btn, the alignment method is not limited to this. For example, the objects may be aligned on a circular arc as in fanned playing cards by sliding the two pressed points in the shape of a circular arc (refer to FIG. 11A). In this case, a circle which fits the arc-shaped trajectory of the pressed points is calculated, and the objects are arranged on a circular arc with the coordinates Atn and Btn on the calculated circle as endpoints. In the aforementioned manner, in the case that the two pressed points detected in the display region of a plurality of objects selected in step S901, the plurality of selected objects are arranged on a straight line or curve connecting the two pressed points after movement such that the objects are equally spaced apart.

In step S907, the CPU 11 determines whether or not an overlap between aligned and adjacent objects is detected. If the distance between Atn and Btn is small, adjacent objects will be aligned so as to overlap, as shown in the object array 802 in FIG. 8B. In the case that an overlap is detected, the process advances to step S908. If it is not detected, the present operation is ended.

In step S908, the difference in pressure between the two pressed points is calculated. The difference in pressure between the two pressed points is calculated by, for example, comparing the average pressure over the trajectories of the two pressed points in FIG. 6. In FIG. 6, the pressure of each point is constant over the entire time, and the average pressure of point A is 150, while the average pressure of point B is 100, and the pressure of point A is 50 larger than the pressure of point B. However, the pressures compared here are not limited to the average over the trajectory. The pressures at the starting point at time t1, or the pressures at the ending point at time t5 may also be compared.

In step S909, the CPU 11 aligns the direction of overlap such that objects toward the side for which the pressure calculated in step S908 is smaller are displayed in front. In the object array 802 in FIG. 8B, a case in which the pressure of point B is the smaller of the pressures of point A and point B. That is, after alignment, the object array 802 is aligned such that images toward the side of Btn for which the pressure is smaller are displayed in front of images toward the side of Atn.

In the aforementioned manner, in the present embodiment, in the case that a plurality of objects randomly arranged on a touch screen 200 are selected, that plurality of selected objects are arranged to be lined up according to a predetermined sorting standard on a straight line or curve connecting two pressed points after movement. Here, the front/rear overlapping relationship of the plurality of objects arranged between those two pressed points changes based on the detected difference in pressure among the plurality of pressed points. That is, the direction of overlap of the plurality of objects is determined based on the difference in pressure between the two pressed points. More specifically, the overlap of the objects is changed such that the objects are displayed in front from the pressed point for which the pressure is larger toward the pressed point for which the pressure is smaller, and intuitive operation becomes possible. Moreover, as the sorting standard, an object file name order, an object time stamp order, etc., can be given.

Figure 10A:
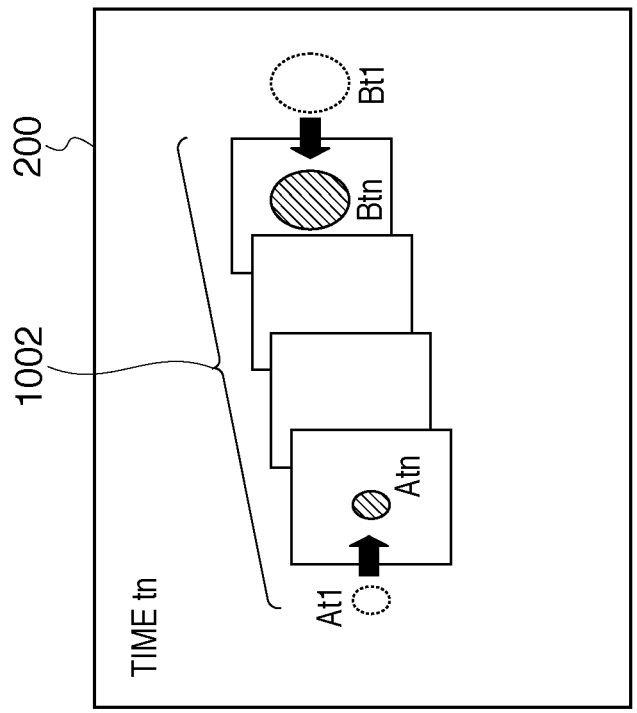
FIGS. 10A and 10B are diagrams illustrating another example of an object alignment operation by the information processing apparatus according to the first embodiment.
Figure 10B:
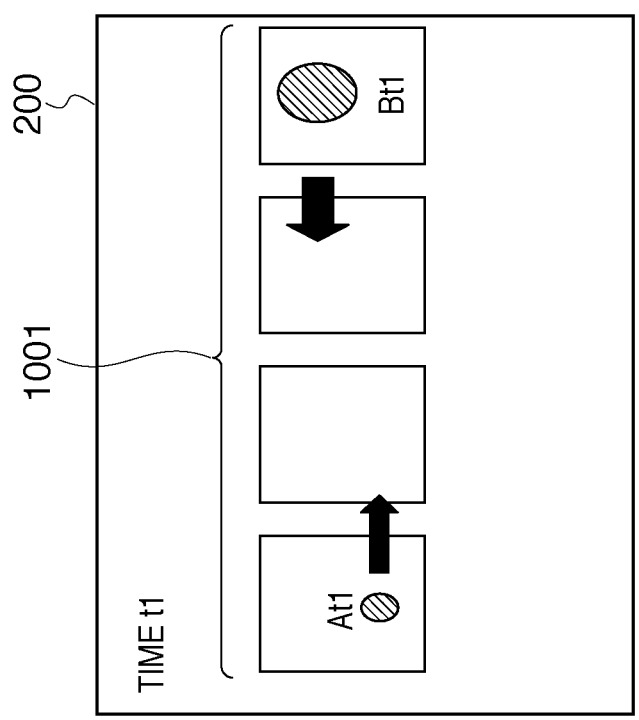

FIGS. 10A and 10B are diagrams illustrating an operation on aligned objects, in contrast to FIGS. 8A and 8B, which illustrate an example of aligning unaligned objects. That is, in the case that an object array of a plurality of aligned objects is selected, that plurality of objects are arranged on a straight line or curve connecting two pressed points after movement while maintaining the alignment order of the object array. Hereinafter, although a case of an operation on an object array in which the objects are arranged without overlapping is explained, it is clear that it is possible to execute similar processing for an operation on an object array in which a portion of the objects overlap.

At time t1, as shown in FIG. 10A, an object array 1001 which is regularly aligned without any overlap between objects is displayed. Moreover, the object array 1001 targeted for operation is selected by the aforementioned processing in step S901.

In step S903, in the case that it is determined that there are two pressed points on the aligned objects, the objects on the trajectory of a straight line connecting the two pressed points are put in a selected state. Moreover, the aligned objects are the object array obtained by aligning the collection of objects 801 as in FIG. 8B by an alignment operation, as shown in FIGS. 8A and 8B. Alternatively, as shown in FIG. 10A, in addition to the objects selected by the pressed points At1 and Bt1, two objects on a straight line connecting At1 and Bt1 may be selected as objects belonging to the object array 1001, that is, aligned objects. Moreover, "the pressed points are on the aligned objects" refers to pressed points detected in the region of any one or more objects among the selected aligned objects.

As shown in FIG. 10B, over time t1 to tn, the point A is slid from coordinate At1 to Atn, while the point B is slid from coordinate Bt1 to Btn. The CPU 11 then aligns the selected objects between Atn and Btn in step S906 in FIG. 9. Here, when the distance between Atn and Btn is below a constant value, the CPU 11 detects an object overlap (step S907 in FIG. 9). Then, the CPU 11 overlaps and aligns the objects such that objects on the side with the lower pressure are in front, and displays them (step S909).

Moreover, in contrast to FIGS. 8A and 8B, FIGS. 10A and 10B illustrate a case in which the pressure of point B is larger than the pressure of point A. Therefore, by the processing in step S909, objects closer to Atn are displayed so as to be in front, as shown in the object array 1002. Moreover, in the example of FIG. 10B, the objects are aligned such that the centers are aligned with each of the pressed points A and B after movement. That is, point A and point B are object centers, and the objects are aligned such that each object is arranged to be equally spaced apart in the horizontal and vertical directions, respectively. Moreover, although the pressing points are the object centers in this example, there is no limitation to this, and objects may be aligned without relation to the positions of the pressing points on the objects. For example, the interval of the objects may be changed in only the horizontal direction, as shown in FIG. 10A.

As mentioned above, according to the first embodiment, by introducing an alignment method based on the difference in pressure between a plurality of pressed points, the operation which was conventionally executed in two steps of aligning the objects and then changing the overlap direction can be executed in one step.

Figure 11A:
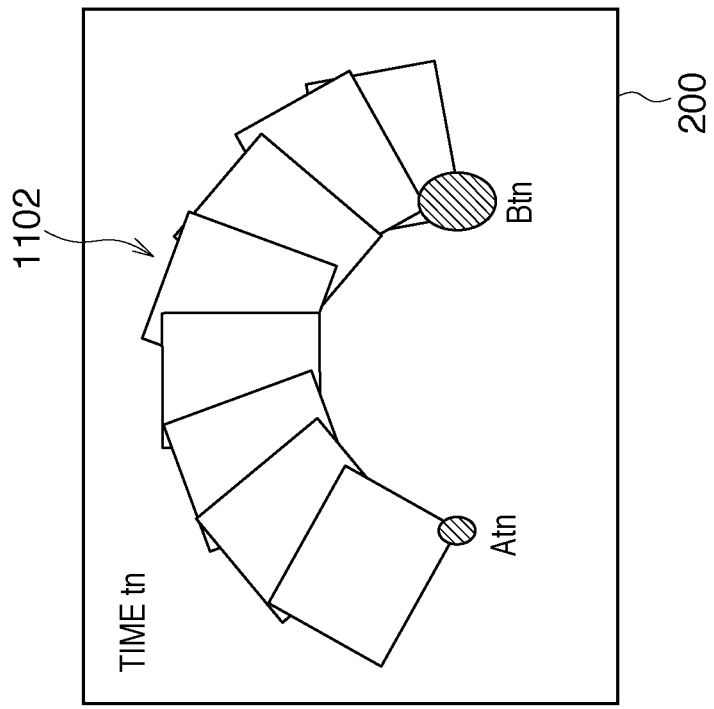
FIGS. 11A and 11B are diagrams illustrating an example of an object alignment operation by the information processing apparatus according to the second embodiment.
Figure 11B:
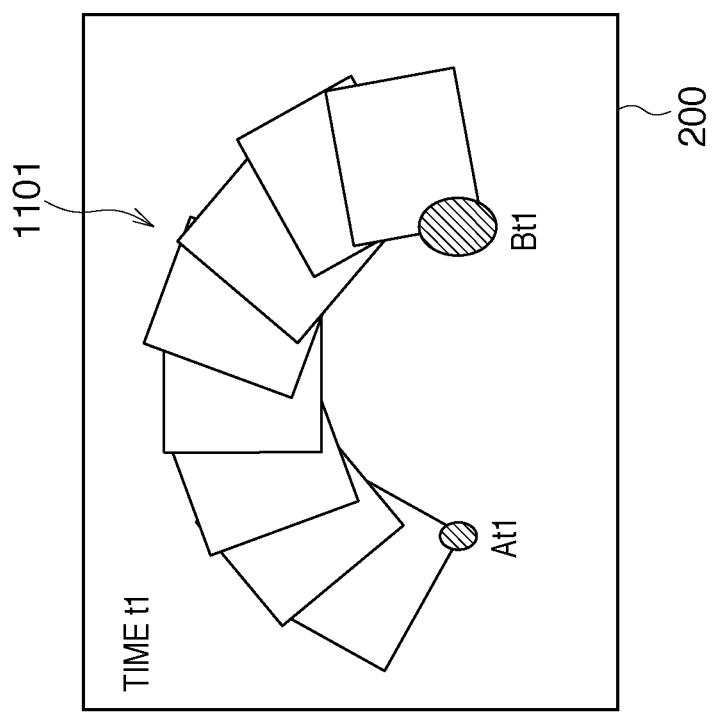

FIGS. 11A and 11B are diagrams illustrating an example of an object operation according to the second embodiment.

At time t1, as shown in the object array 1101 in FIG. 11A, the plurality of objects is aligned in an overlapping fan shape. Furthermore, in the object array 1101, the objects are regularly aligned such that those on the right side are in front. Furthermore, at time t1, the points At1 and Bt1 are pressed on the aligned objects at the same time, and the pressures of the pressed points A and B are such that point A<point B. In this case, the CPU 11 interprets the pressed operation to be a designation to change the overlap direction of the aligned objects. Next, the overlap of the objects in the object array is changed such that objects toward the pressed point for which the pressure is smaller are displayed in front, as shown in the object array 1102 in FIG. 11B.

Figure 12:
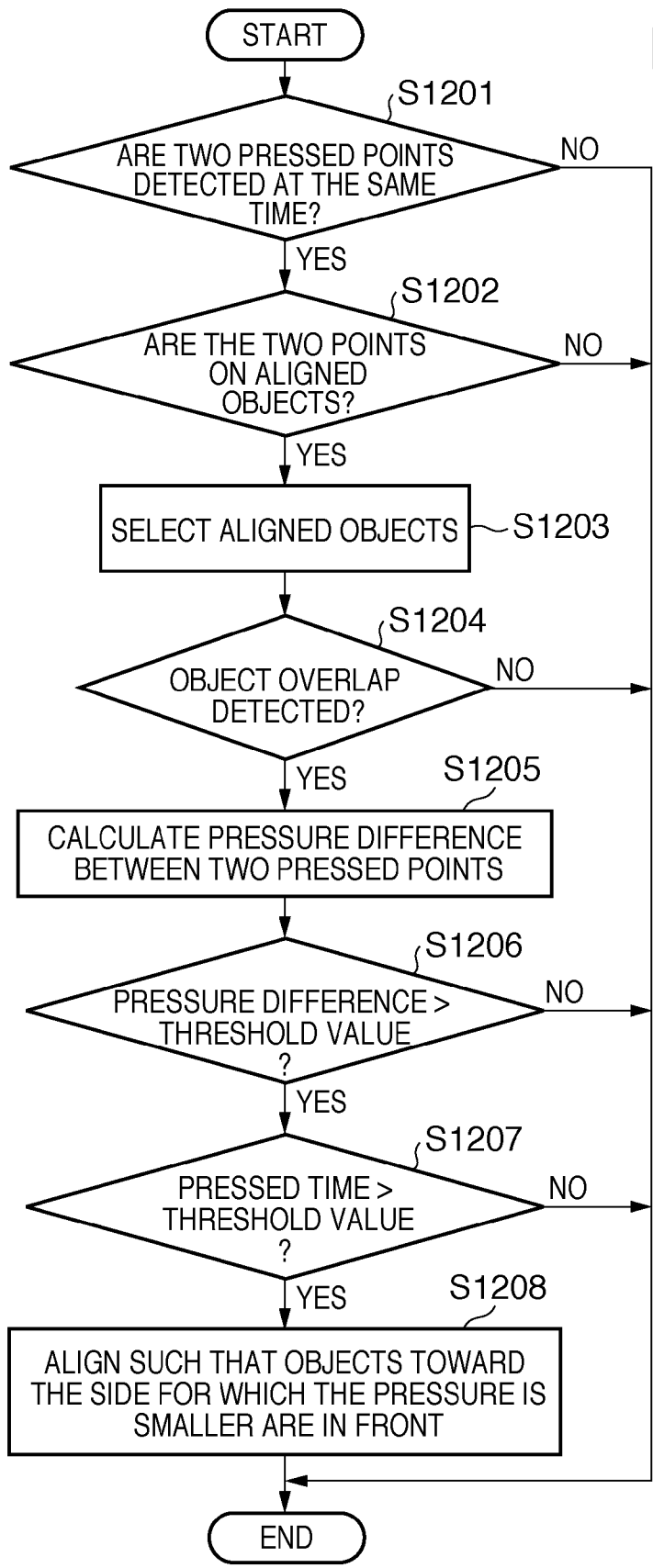
FIG. 12 is a flowchart illustrating processing of an object alignment operation by the information processing apparatus according to the second embodiment.

FIG. 12 is a flowchart explaining alignment operation processing according to the second embodiment. Moreover, FIG. 12 corresponds to step S703 (input interpretation processing) and step S704 (operation execution processing) in FIG. 7.

In step S1201, the CPU 11 determines whether or not two pressed points are detected at the same time on the touch screen 200. If they are detected, the process advances to step S1202. In the case that such pressed points have not been detected after a predetermined amount of time passes, or in the case that a pressed point with an intention for a different operation is detected, the present operation is ended. As a pressed point with an intention for a different operation, a case in which only one pressed point exists and it begins to move, etc., can be given.

In step S1202, the CPU 11 determines whether or not the two pressed points detected in step S1201 are on the same aligned object. In the case that it is determined that they are on the same aligned object, the process advances to step S1203. Otherwise, the process is ended. Moreover, when "determining whether or not the two pressed points detected in step S1201 are on the same aligned object", whether or not they are on the same aligned object is determined in the following manner. (1) The aligned objects are selected by a loop operation (however, in that case, step S1203 is unnecessary). (2) Because the alignment operation in FIG. 9 is definitely executed on the aligned objects beforehand, information that the plurality of objects belongs to the same aligned objects (for example, a group ID) is stored in the RAM 13 during the alignment operation. In this case, when the single objects under each of the two pressed points have the same group ID, it is determined that the operation is directed to the aligned objects as a whole.

In step S1203, the CPU 11 selects all objects included in the aligned objects. For example, in the case that the positions At1 and Bt1 of the objects on both ends of the aligned objects aligned in a fan shape in FIG. 11A are pressed at the same time, all objects comprising the aligned objects (object array 1101) are put in a selected state.

In step S1204, the CPU 11 determines whether or not there are objects in the aligned objects selected in step S1203 that overlap each other. In the case that an overlap is detected between objects, the process advances to step S1205. If one is not detected, the present process ends.

In step S1205, the CPU 11 calculates the difference in pressure between the two pressed points. For example, the CPU 11 calculates the difference in pressure from the pressure of the two points recorded as in FIG. 6.

In step S1206, the CPU 11 determines whether or not the difference in pressure calculated in step S1205 exceeds a predetermined threshold value (pressure difference threshold value). This is processing to execute an operation only in the case that the operator intentionally changes the pressure of the two pressed points, since strictly speaking, a difference in pressure between two points will emerge even when the operator intends to press the two points with the same strength. Moreover, the aforementioned threshold value may be set by the user. In the case that it is determined that the difference in pressure between the two detected points exceeds a threshold value, the process advances to step S1207. On the other hand, if it is not exceeded, the present process is ended.

In step S1207, the CPU 11 determines whether or not the pressures of the two pressed points on the aligned objects continue for more than a predetermined amount of time while maintaining the difference in pressure (difference in pressure which exceeds the threshold value) detected in step S1206. In the case that the aforementioned difference in pressure is maintained for more than a predetermined amount of time, the process advances to step S1208, and in other cases the process is ended.

In step S1208, the CPU 11 changes the display mode of the aligned objects such that objects on the side on which the pressure is smaller are displayed in front. In FIG. 11A, pressed points for which the difference in pressure is such that point A<point B over time t1 to tn are detected on the objects aligned and displayed such that the objects on the right side are displayed in front. Here, in the case that the time tn-t1 exceeds a predetermined time threshold value and the difference in pressure between point A and point B exceeds a predetermined pressure difference threshold value, the CPU 11 interprets these pressed points to be an operation which changes the overlap direction of the aligned objects. Next, the CPU 11 changes the overlap direction of the aligned objects such that objects toward the side on which the pressure is smaller, that is, closer to point A, are moved to the front, as shown in the object array 1102 in FIG. 11B.

Figure 14A:
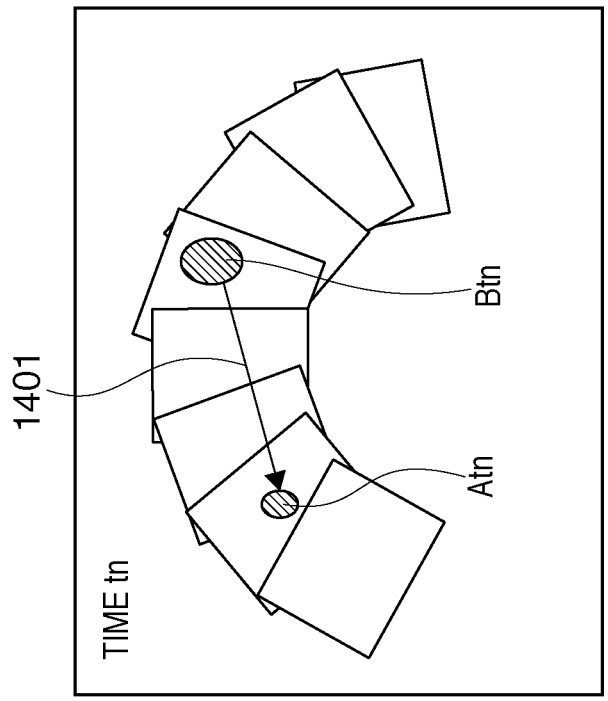
FIGS. 14A and 14B are diagrams illustrating another example of an object alignment operation according to the second embodiment.
Figure 14B:
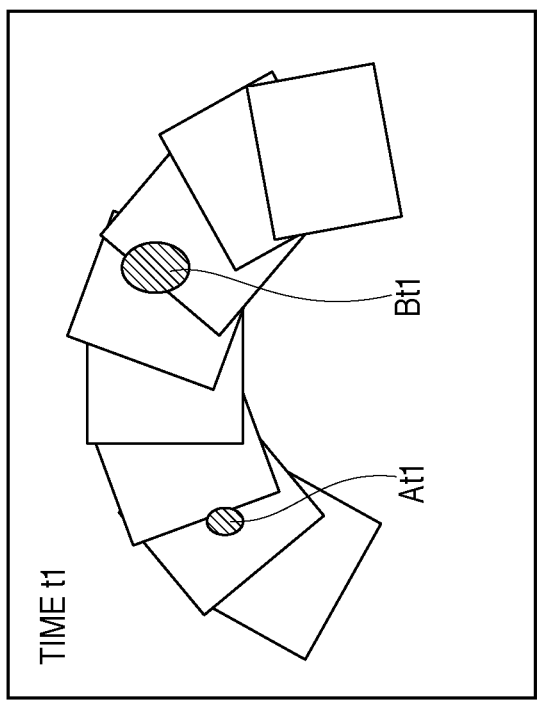

In the aforementioned manner, in the second embodiment, in the case that two pressed points are detected on an object array in which a plurality of objects is aligned with overlap, the direction of overlap of the objects comprising the object array is changed in accordance with the direction of the difference in pressure between those two pressed points. Moreover, in the aforementioned explanation, although pressed points on objects at both ends of the object array are indicated, there is no limitation to this. The overlap of the objects may be changed in accordance with a difference in pressure between two pressed points designated within the display range of the object array or within a range including the proximity of the object array. For example, as shown in FIG. 14A, in the case that At1 and Bt1 are designated and these are held until time tn, the direction of overlap is changed as shown in FIG. 14B. That is, the direction of overlap of the object array is changed in accordance with the pressure difference direction 1401, and the same result as in FIG. 11B is obtained.

Thus, it is possible to change the direction of overlap of all the aligned objects in 1 step by using the difference in pressure between 2 pressed points.

Figure 13A:
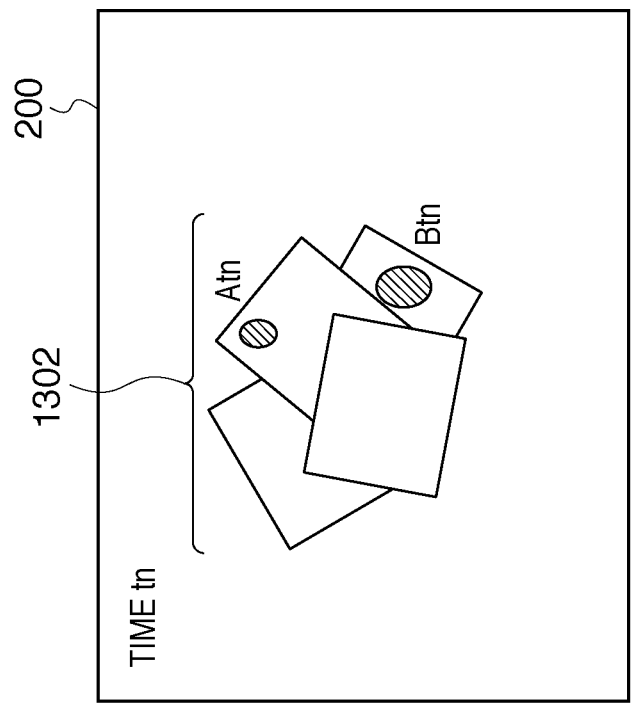
FIGS. 13A and 13B are diagrams illustrating another example of an object alignment operation by the information processing apparatus according to a modification of the second embodiment.
Figure 13B:
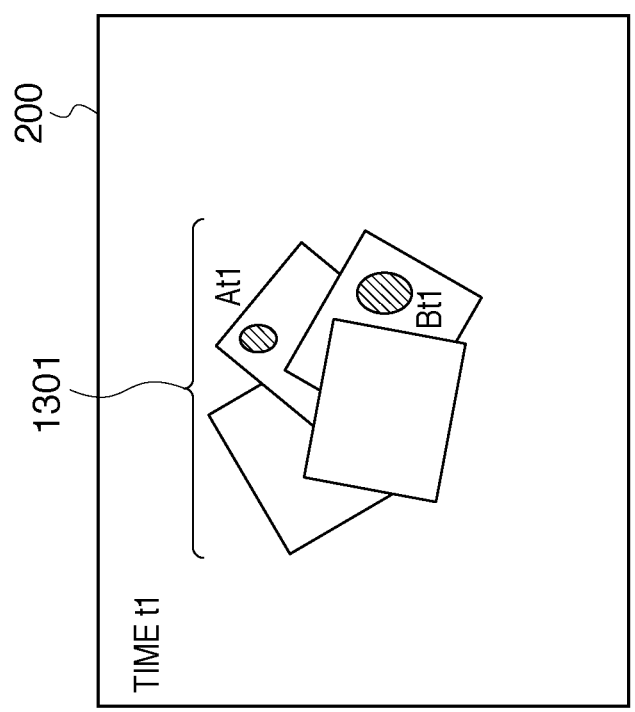

FIGS. 13A and 13B are diagrams illustrating a modification of the second embodiment.

As shown in FIG. 13A at time t1, there is a collection of objects 1301 having overlap between the objects, and At1 and Bt1 are pressed at the same time at time t1. Here, the pressures of the pressed points A and B are such that point A<point B. In this case, the CPU 11 interprets the pressed input as an instruction to change the direction of overlap of the objects in the collection of objects 1301 pressed by point A and point B. The CPU 11 then changes the direction of overlap such that the object designated by the pressed point with the smaller pressure is displayed in front for only the objects pressed by point A and point B, as shown in the collection of objects 1302 in FIG. 13B.

In the above manner, in the aforementioned modification, in the case that two objects which partially overlap each other are selected from among a plurality of objects by two pressed points, the front/rear display relationship of both objects is changed based on the difference in pressure between the two pressed points. More specifically, of the two objects selected by the two pressed points, the object corresponding to the pressed point with the smaller pressure is displayed in front. According to such control, because it is possible to change the direction of overlap for any arbitrary objects in a collection of objects in one step by using the difference in pressure between two pressed points, operability can be improved.

According to each embodiment of the present invention exemplified above, it is possible to provide an environment which allows intuitive operation of objects on a screen by using a difference in pressure which selects a plurality of objects by pressing on a touch screen.

Although embodiments were described in detail above, the present invention can be embodied as, for example, a system, device, method, program, or storage medium, etc. Specifically, it may be applied in a system comprising a plurality of devices or an apparatus comprised of a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus having a touch screen which detects a touch input, comprising:
   an obtaining unit configured to obtain position of each of a plurality of pressed points corresponding to a plurality of touch inputs existing at the same time on the touch screen;
   a display unit configured to display a plurality of objects on the touch screen; and
   a display changing unit configure to, if a movement of positions of the plurality of pressed points from positions of the plurality of objects displayed by the display unit is detected, change locations of the plurality of objects based on the movement.

2. The apparatus according to claim 1, wherein the display changing unit changes a display such that the plurality of objects are aligned.

3. The apparatus according to claim 1, wherein the display changing unit changes a display interval of the plurality of objects.

4. The apparatus according to claim 1, wherein the display unit displays the plurality of objects overlapping each other, and the display changing unit changes a display of the plurality of objects such that the plurality of objects spread.

5. The apparatus according to claim 1, wherein the display changing unit changes front/rear overlap relationship o the plurality of objects.

6. The apparatus according to claim 1, wherein the display changing unit detects, as the movement, that positions of the plurality of pressed points move such that they become further away from each other.

7. The apparatus according to claim 1, wherein the obtaining unit further obtains pressure of each of the plurality of pressed points.

8. The apparatus according to claim 7, wherein the display changing unit changes display of the plurality of objects based on difference in pressure obtained by the obtaining unit between the plurality of pressed points.

9. An information processing apparatus having a touch screen which detects a touch input, comprising:
an obtaining unit configured to obtain pressure of each of a plurality of pressed points corresponding to a plurality of touch inputs existing at the same time on the touch screen; and
a generation unit configured to generate an operation instruction based on pressure of the plurality of pressed points.

10. The apparatus according to claim 9, wherein
the obtaining unit further obtains a relationship between pressures of the plurality of pressed points, and
the generation unit generates operation instruction based on the relationship of the pressure.

11. The apparatus according to claim 9, wherein
the obtaining unit further obtains movement of the plurality of pressed points, and
the generation unit generates operation instruction based on pressure of the plurality of pressed points and the movement.

12. The apparatus according to claim 9, further comprising a display control unit configured to perform display control for one or a plurality of objects displayed on the touch screen based on the pressure of the plurality of pressed points, which have been obtained by the obtaining unit.

13. The apparatus according to claim 12, wherein the display control unit aligns the plurality of objects based on pressure of the plurality of pressed points.

14. The apparatus according to claim 12, wherein the plurality of object have a front/rear overlap relationship, and the display control unit changes the front/rear overlap relationship of the plurality of objects based on the pressure.

15. An information processing apparatus having a touch screen which detects a touch input, comprising:
an obtaining unit configured to obtain pressure of each of a plurality of pressed points corresponding to a plurality of touch inputs existing at the same time on the touch screen;
a display control unit configured to control displaying, on the touch screen, a representation corresponding to the pressure obtained by the obtaining unit, such that a user can recognize pressure of the plurality of pressed points.

16. The apparatus according to claim 13, wherein the obtaining unit further obtains location of a plurality of pressed points, and the display control unit displays an object at a position corresponding to the location, which has a size corresponding to the pressure.

17. A control method of an information processing apparatus having a touch screen which detects a touch input by a user, comprising:
an obtaining step of obtaining position of each of a plurality of pressed points corresponding to a plurality of touch inputs existing at the same time on the touch screen;
a display step of displaying a plurality of objects on the touch screen; and
a display changing step of changing, if positions of the plurality of pressed points obtained in the obtaining step move from positions of the plurality of objects displayed in the display step, locations of the plurality of objects based on the movement.

18. A control method of an information processing apparatus having a touch screen which detects a touch input, comprising:
an obtaining step of obtaining pressure of each of a plurality of pressed points corresponding to a plurality of touch inputs existing at the same time on the touch screen;
a generation step of generating an operation instruction based on pressure of the plurality of pressed points.

19. A control method of an information processing apparatus having a touch screen which detects a touch input, comprising:
an obtaining step of obtaining pressure of each of a plurality of pressed points corresponding to a plurality of touch inputs existing at the same time on the touch screen;
a display control step of controlling to display, on the touch screen, a representation corresponding to the pressure obtained in the obtaining step, such that a user can recognize pressure of the plurality of pressed points.

20. A non-transitory computer readable storage medium storing a program for causing a computer to execute a method of an information processing apparatus having a touch screen which detects a touch input by a user, the method comprising:
an obtaining step of obtaining position of each of a plurality of pressed points corresponding to a plurality of touch inputs existing at the same time on the touch screen;
a display step of displaying a plurality of objects on the touch screen; and
a display changing step of changing, if positions of the plurality of pressed points obtained in the obtaining step move from positions of the plurality of objects displayed in the display step, locations of the plurality of objects based on the movement.

21. A non-transitory computer readable storage medium storing a program for causing a computer to execute a method of an information processing apparatus having a touch screen which detects a touch input, the method comprising:
an obtaining step of obtaining pressure of each of a plurality of pressed points corresponding to a plurality of touch inputs existing at the same time on the touch screen;
a generation step of generating an operation instruction based on pressure of the plurality of pressed points.

22. A non-transitory computer readable storage medium storing a program for causing a computer to execute a method of an information processing apparatus having a touch screen which detects a touch input, the method comprising:
an obtaining step of obtaining pressure of each of a plurality of pressed points corresponding to a plurality of touch inputs existing at the same time on the touch screen;
a display control step of controlling to display, on the touch screen, a representation corresponding to the pressure obtained in the obtaining step, such that a user can recognize pressure of the plurality of pressed points.

* * * * *